(12) United States Patent
Gaeth et al.

(10) Patent No.: US 7,062,944 B2
(45) Date of Patent: Jun. 20, 2006

(54) DUAL TAPER STEERING COLUMN LOCK BOLT

(75) Inventors: Gerald A. Gaeth, Frankenmuth, MI (US); Gregory P. Ruth, Birch Run, MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 11/138,046

(22) Filed: May 26, 2005

(65) Prior Publication Data

US 2005/0210935 A1    Sep. 29, 2005

Related U.S. Application Data

(63) Continuation-in-part of application No. 10/723,669, filed on Nov. 26, 2003, now abandoned.

(51) Int. Cl.
*B60R 25/02* (2006.01)
(52) U.S. Cl. .......................... 70/186; 70/252
(58) Field of Classification Search .......... 70/182–186, 70/252; 292/DIG. 39, DIG. 40, DIG. 51, 292/DIG. 55
See application file for complete search history.

(56) References Cited

U.S. PATENT DOCUMENTS

| 3,596,483 | A |   | 8/1971  | Elliott           |
|-----------|---|---|---------|-------------------|
| 3,638,462 | A |   | 2/1972  | White et al.      |
| 3,648,490 | A |   | 3/1972  | Kimberlin et al.  |
| 3,703,092 | A |   | 11/1972 | Elliott           |
| 4,029,168 | A |   | 6/1977  | Kramer            |
| 4,031,728 | A |   | 6/1977  | Eichenauer        |
| 4,258,560 | A |   | 3/1981  | Jessop            |
| 5,746,458 | A | * | 5/1998  | Fisher ........ 292/252 |
| 5,848,540 | A |   | 12/1998 | Pieper            |
| 5,906,120 | A |   | 5/1999  | Thacker et al.    |

* cited by examiner

*Primary Examiner*—Lloyd A. Gall
(74) *Attorney, Agent, or Firm*—Michael D. Smith

(57) ABSTRACT

The invention provides a locking pin for a steering column lock assembly. The locking pin includes a dual taper defined by the first and second truncated cone portions. The first truncated cone portion narrows at a first angle and the second truncated cone portion narrows at a second angle, wherein the first and second angles are different from one another. The second angle can be less than the first angle. The dual taper of the locking pin reduces the likelihood that extreme torsion will not induce camming forces urging the locking pin out of engagement with a locking plate connected to the steering shaft.

17 Claims, 4 Drawing Sheets

DUAL TAPER STEERING COLUMN LOCK BOLT

CROSS REFERENCE TO RELATED APPLICATIONS

This application is a continuation-in-part of U.S. patent application Ser. No. 10/723,669 for a DUAL TAPER STEERING COLUMN LOCK BOLT, filed on Nov. 26, 2003, now abandoned, which is hereby incorporated by reference in its entirety.

TECHNICAL FIELD

The invention relates to a lock for a steering column of a vehicle to prevent the steering wheel from being turned.

BACKGROUND OF THE INVENTION

Steering columns in vehicles normally include a locking mechanism to prevent turning of the steering wheel when the ignition is off and the key is removed. As shown in U.S. Pat. No. 4,258,560, a steering column lock can include a locking plate connected to an upper end of a steering shaft. The steering shaft connects the steering wheel with the steerable tires of the vehicle. The locking plate extends radially from the steering shaft and defines one or more apertures for receiving a locking pin. When the locking pin is inserted in the aperture, the steering shaft is locked.

The locking pin can define a tapered surface that engages the aperture of the locking plate. The tapered surface can enhance removal of the pin with respect to the locking plate, to enhance and facilitate unlocking of the steering column. For example, the edge of the aperture can slide along the tapered surface of the pin during insertion and removal of the pin, preventing binding between the two parts. However, during unauthorized starting of the vehicle, the steering shaft can be subjected to extreme torsional loading. During the severe torsion that can be generated during an attempted theft of the vehicle, the tapered surface of the locking pin can act as a cam follower surface and the surface of the aperture of the locking plate can act as a cam. In other words, the locking plate can drive the locking pin out of engagement with the aperture when a theft of the vehicle is attempted, making the theft easier.

SUMMARY OF THE INVENTION

The present invention provides a steering column lock assembly including a steering shaft defining an aperture and a locking pin insertable in the aperture and having first and second tapered portions for limiting cam-cam follower cooperation between the locking pin and the aperture. The tapered surfaces define first and second truncated cone portions having different angles. The locking pin can include a first truncated cone portion narrowing from a first end at a first angle to a second end. A second truncated cone portion can extend from the second end and narrow at a second angle to a third end. The first and second angles are different with respect to one another. The second angle is less than the first angle. The first angle can define a tapered surface to enhance unlocking of the steering column. For example, the first truncated cone portion can make it easier to unlock the steering column by sliding against a locking plate in the steering column. The second angle can define a tapered surface that reduces the likelihood that extreme torsional loading will drive the locking pin out of engagement with a locking aperture defined by the steering shaft. For example, the sliding movement described above is reduced by the second truncated cone portion to deter vehicle theft. The two cone portions cooperate to facilitate enhanced removal of the locking pin during authorized vehicle start-up, while simultaneously restricting movement of the pin during unauthorized vehicle start-up.

Other applications of the present invention will become apparent to those skilled in the art when the following description of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and wherein.

DESCRIPTION OF THE PREFERRED EMBODIMENT

Figure 1:
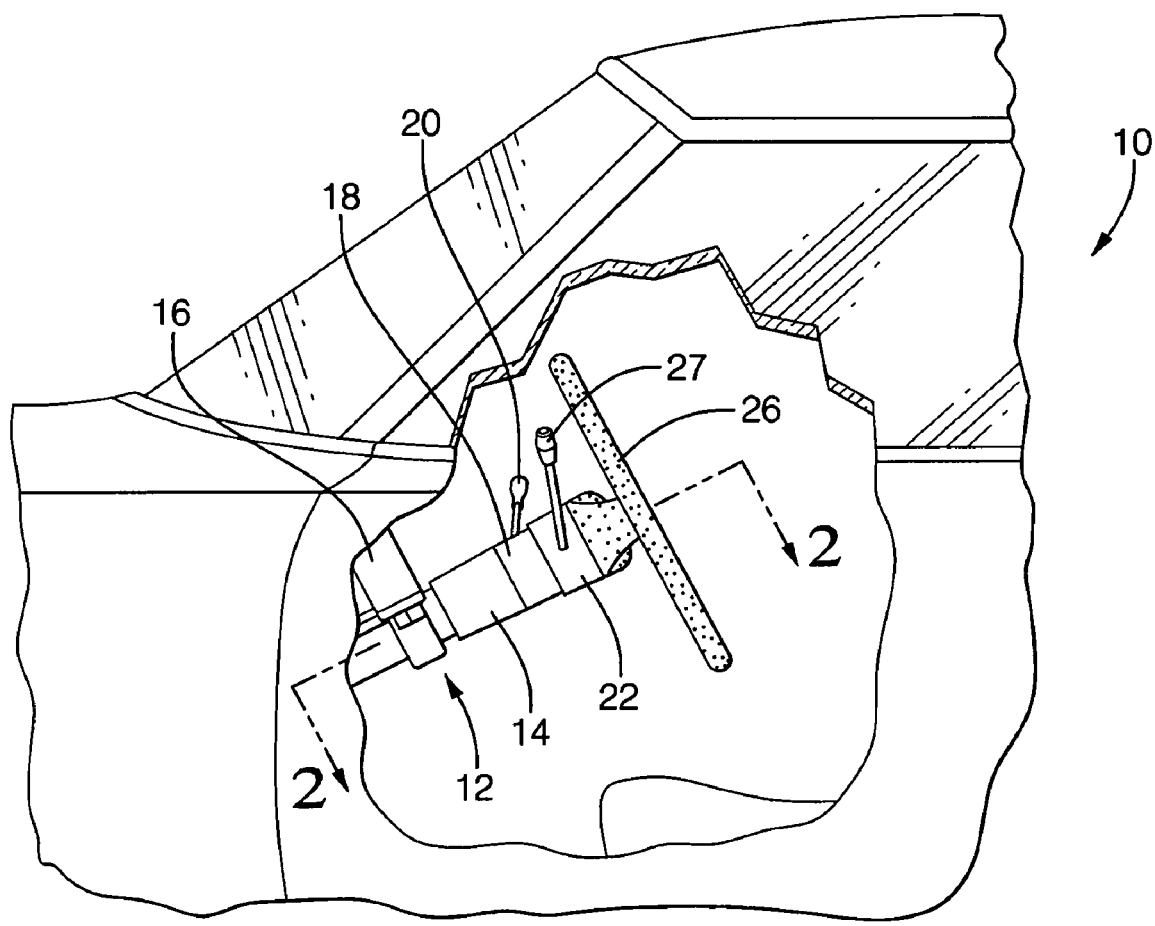
FIG. 1 is a side view of a steering column assembly according to an embodiment of the invention disposed in a vehicle.

A plurality of different embodiments of the invention are shown in the Figures of the application. Similar features are shown in the various embodiments of the invention. Similar features have been numbered with a common two-digit reference numeral and have been differentiated by a third digit placed before the two common digits. Also, to enhance consistency, features in any particular drawing share the same third digit designation even if the feature is shown in less than all embodiments. Similar features are structured similarly, operate similarly, and/or have the same function unless otherwise indicated by the drawings or this specification. Furthermore, particular features of one embodiment can replace corresponding features in another embodiment unless otherwise indicated by the drawings or this specification.

Referring to FIG. 1, a vehicle 10 is shown including a steering column assembly 12 mounted in the forward passenger compartment. The steering column assembly 12 extends through the firewall of the vehicle engine compartment and includes a cylindrical upper jacket 14 secured by a bracket assembly 16 to support structure of the vehicle 10. A shift bowl 18 is supported for limited rotational movement on the upper end of the jacket 14 and may be turned by the vehicle operator through a selector lever 20. A generally cylindrical housing 22 is secured to the upper jacket 14 and located between the shift bowl 18 and steering wheel 26. The housing 22 can also support a lever 27 for operating turn signals or headlamps of the vehicle 10. A steering wheel 26 is drivingly connected to a rotatable steering shaft 28 (best shown in FIGS. 2 and 3). The steering wheel 26 engages the shaft 28 at a hub 29. The shaft 28 extends axially within the steering column assembly 12 to operably connect the steering wheel 26 with respect to the wheels of the vehicle through a conventional steering gear and linkage.

Figure 2:
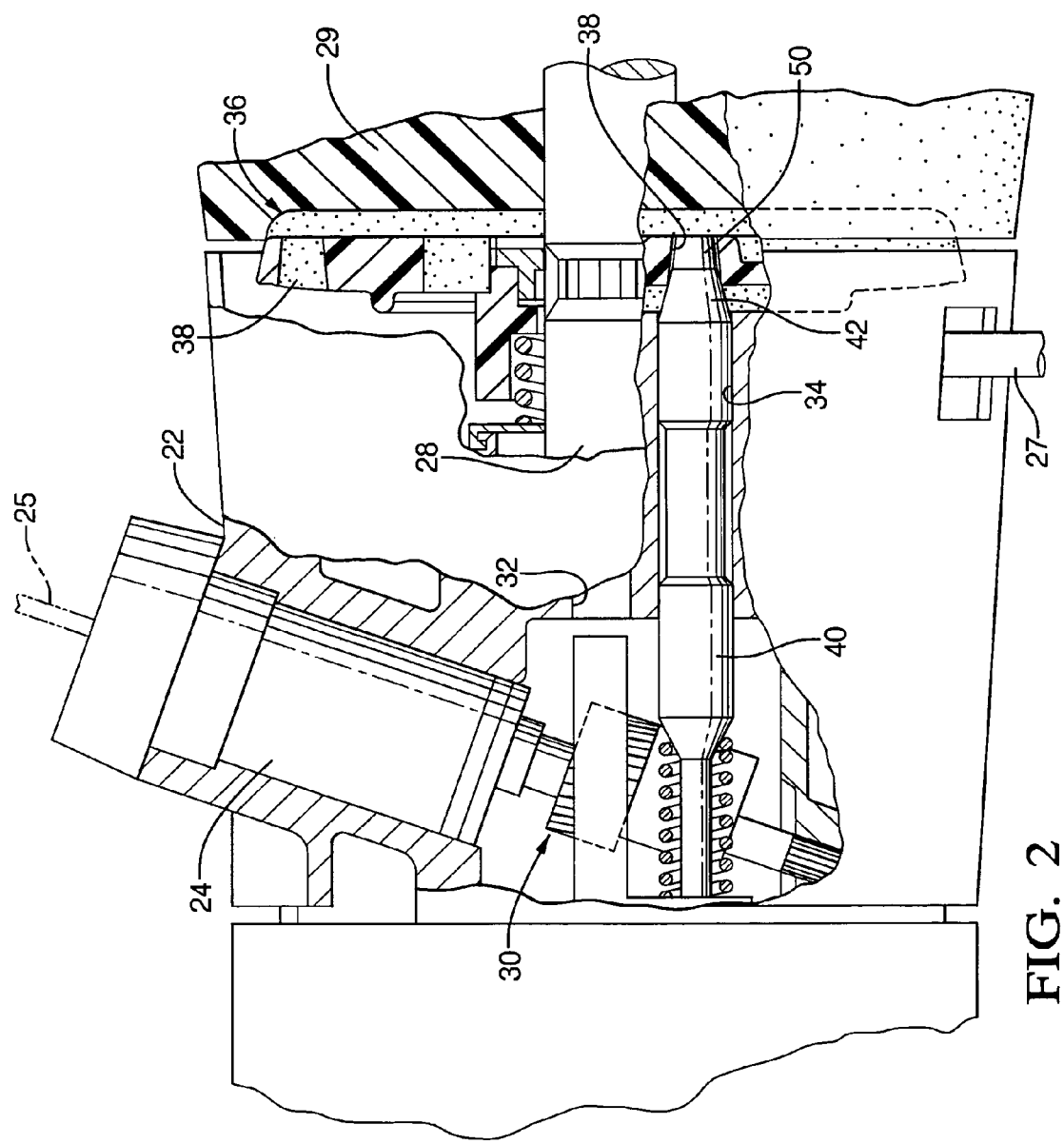
FIG. 2 is a partial cross-sectional view of the steering column assembly shown in FIG. 1 wherein the locking pin is engaged with respect to a locking plate member.
Figure 3:
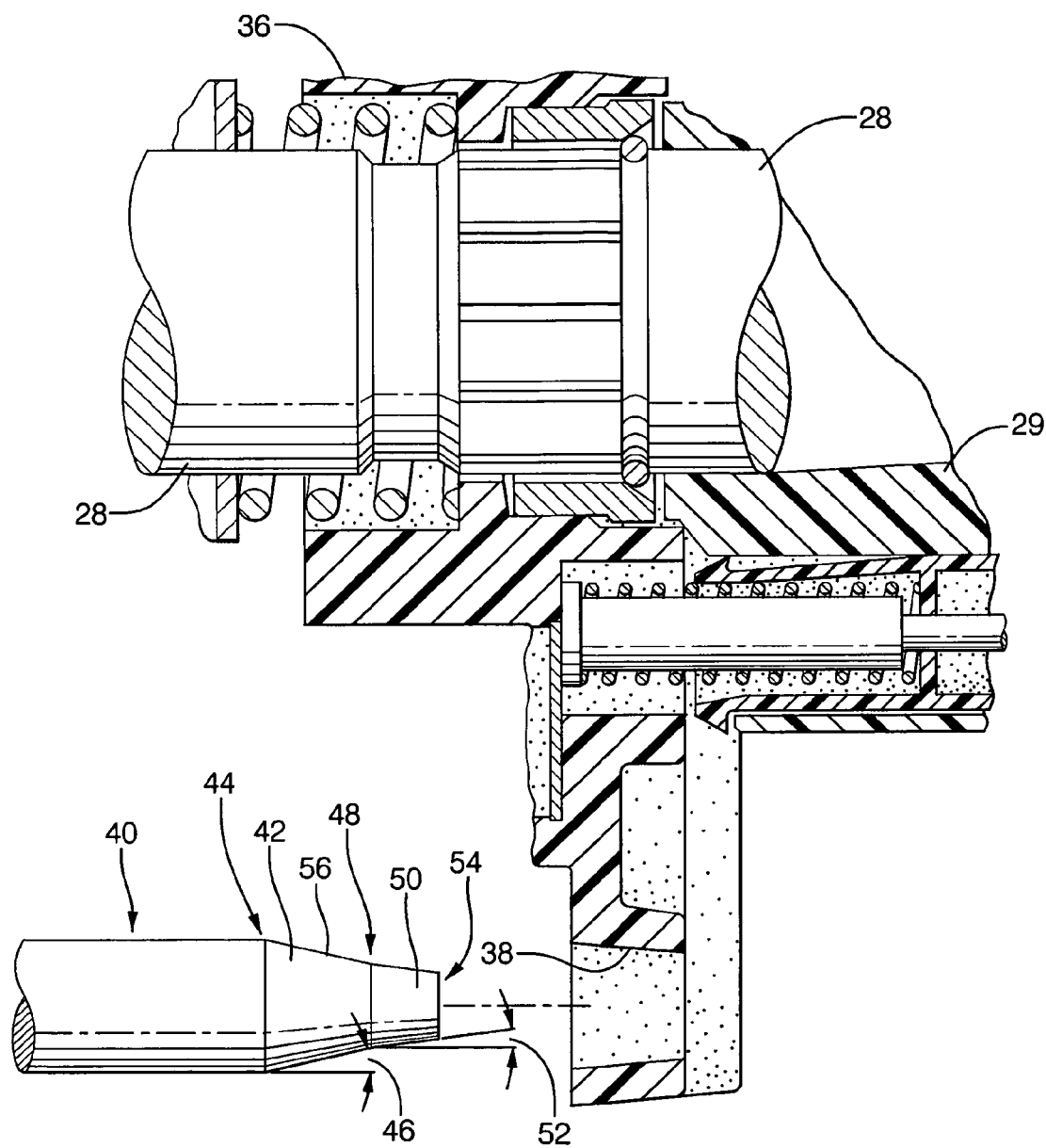
FIG. 3 is a partial cross-sectional view of the steering column assembly shown in FIGS. 1 and 2 wherein the locking pin is disengaged with respect to the locking plate member.

Referring now to FIGS. 2 and 3, the steering column assembly 12 according to the invention includes a steering shaft 28 defining at least one receiving portion 38 and a locking pin 40. The receiving portion 38 can be an aperture or can be a notch. The locking pin 40 is selectively insertable in the receiving portion 38. The locking pin 40 is moveable between at least two positions. In a first position corresponding to a locked position, the locking pin 40 is insertable in the receiving portion to prevent rotation of the steering shaft 28. In a second position corresponding to an unlocked position, the locking pin 40 is disengaged with respect to the receiving portion 38 and the steering shaft 28 is rotatable.

The steering shaft 28 is shown mounted for rotation in a first longitudinal recess 32 defined by the steering column housing 22. The housing 22 also defines a second recess 34 for receiving the locking pin 40. The locking pin 40 can be slidably mounted within the second recess 34 of the steering column housing 22. The second recess 34 can extend parallel to the first recess 32 and be offset with respect to the first recess 32. In an alternative embodiment, the second recess could extend radially from the first recess.

The housing 22 is also shown supporting a locking cylinder 24. The locking cylinder 24 can receive a key 25. The key 25 can be inserted in the locking cylinder 24 and rotated to move a gear train 30 and slide the locking pin 40 relative to the housing 22 within the second recess 34. For example, when the key 25 is removed from the locking cylinder 24, the locking pin 40 is inserted in the receiving portion 38.

A plate member 36 can be immovably associated with respect to the steering shaft 28. The receiving portion 38 is shown defined by the plate member 36, however, the receiving portion 38 could be defined by the steering shaft 28. The plate member 36 is rotatably locked with respect to the steering shaft 28 such that the plate member 36 rotates in response to rotation of a steering wheel 26 and insertion of the locking pin 40 in the receiving portion 38 defined by the plate member 36 prevents rotation of the steering shaft 28 and steering wheel 26.

The plate member 36 rotates the receiving portion 38 in response to rotation of the shaft 28. During rotation of the plate member 36, the receiving portion 38 intermittently communicates with the second recess 34. The locking pin 40 can be inserted with respect to the receiving portion 38 when the receiving portion 38 is in communication with the recess 34. As shown in FIGS. 2 and 3, the receiving portion 38 can extend in parallel relation to the steering shaft 28.

The locking pin 40 includes a first truncated cone portion 42 narrowing from a first end 44 at a first angle 46 to a second end 48. The locking pin 40 also includes a second truncated cone portion 50 extending from the second end 48 and narrowing from the second end 48 at a second angle 52 to a third end 54. The first and second truncated cone portions 42, 50 can extend concentrically with respect to one another. The first and second angles 46, 52 are different. The second angle 52 can be less than the first angle 46. By way of example and not limitation, the second angle 52 can be one-half of the first angle 46. For example, the second angle 52 can be four degrees and the first angle 46 can be eight degrees.

The first and second truncated cone portions 42, 50 can be inserted in the receiving portion 38. The receiving portion 38 and locking pin 40 can cooperate in cam-cam follower relationship. For example, the first truncated cone portion 42 can be angled to enhance sliding between the locking pin 40 and the receiving portion 38. Enhanced sliding engagement between the locking pin 40 and the receiving portion 38 can be desirable during authorized insertion and removal of the locking pin 40 with respect to the receiving portion 38. For example, the angled surface 56 of the first truncated cone portion 42 can guide insertion of the locking pin 40 with respect to the receiving portion 38 and alleviate slight misalignments between the two parts. Also, the angled surface 56 of the first truncated cone portion 42 can communicate torsion from the receiving portion 38 to axial force urging the locking pin 40 out of engagement with the receiving portion during authorized vehicle start-up.

The second cone portion 50 can be angled to be less likely to cooperate in cam-cam follower relationship with the receiving portion 38 than the first truncated cone portion 42. For example, the second truncated cone portion 50 is flatter than the first truncated cone portion 42 to reduce the likelihood that torsion will urge the locking pin 40 out of engagement with the receiving portion 38. Extreme torsion can occur during an attempted theft of the vehicle. It has been determined that the present invention reduces by one-half the force urging the bolt 40 out of the receiving portion 38 during extreme torsion loading. Specifically, the urging force generated torsion loading.

Figure 4:
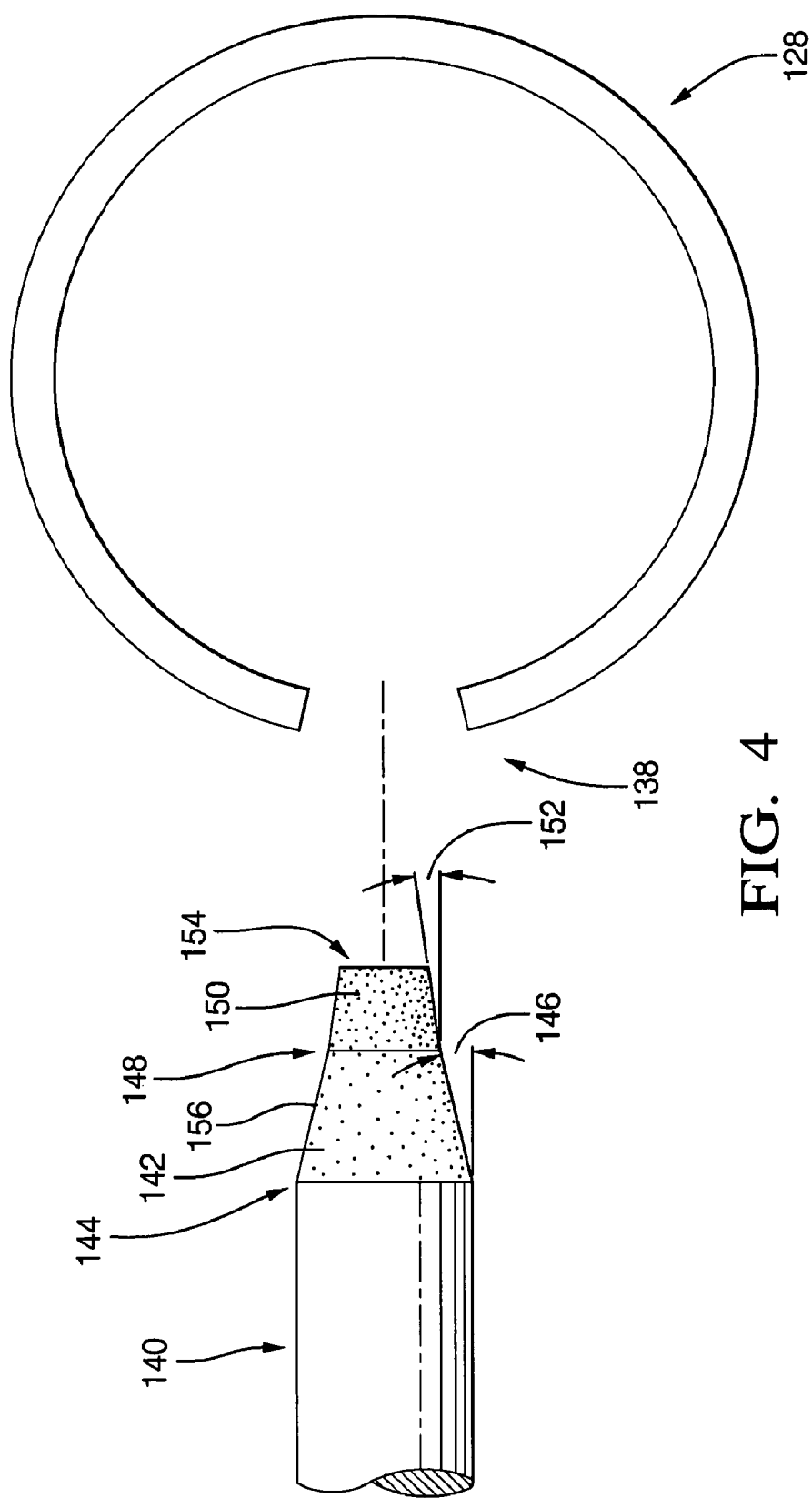
FIG. 4 is a partial cross-sectional view of the steering column assembly shown in FIG. 1 detailing the second exemplary embodiment including the locking pin, locking pin recess and steering shaft receiving slot each perpendicular to the shaft longitudinal axis wherein the locking pin is disengaged with respect to the steering shaft.

Referring now to FIG. 4, in a second exemplary embodiment of the invention, a locking pin 140 includes a first truncated cone portion 142 narrowing from a first end 144 at a first angle 146 to a second end 148. The locking pin 140 also includes a second truncated cone portion 150 extending from the second end 148 and narrowing from the second end 148 at a second angle 152 to a third end 154. The first and second truncated cone portions 142, 150 can extend concentrically with respect to one another. The first and second angles 146, 152 are different. The second angle 152 can be less than the first angle 146. By way of example and not limitation, the second angle 152 can be one-half of the first angle 146. For example, the second angle 152 can be four degrees and the first angle 146 can be eight degrees.

The locking pin 140 can selectively engage a receiving portion 138 of a steering shaft 128. The receiving portion 138 is defined directing by the steering shaft 128, in comparison with the receiving portion 38 of the first embodiment that is defined by the plate member 36 that is rotatably locked with respect to the steering shaft 28. The receiving portion 138 extends radially with respect to a longitudinal axis of the steering shaft 128. The locking pin 140 can be disposed in a first recess (not shown) extending radially from the receiving portion 138.

The first and second truncated cone portions 142, 150 can be inserted in the receiving portion 138. The receiving portion 138 and locking pin 140 can cooperate in cam-cam follower relationship. For example, the first truncated cone portion 142 can be angled to enhance sliding between the locking pin 140 and the receiving portion 138. Enhanced sliding engagement between the locking pin 140 and the receiving portion 138 can be desirable during authorized insertion and removal of the locking pin 140 with respect to the receiving portion 138. For example, the angled surface 156 of the first truncated cone portion 142 can guide insertion of the locking pin 140 with respect to the receiving portion 138 and alleviate slight misalignments between the two parts. Also, the angled surface 156 of the first truncated cone portion 142 can communicate torsion from the receiving portion 138 to axial force urging the locking pin 140 out of engagement with the receiving portion during authorized vehicle start-up.

The second cone portion 150 can be angled to be less likely to cooperate in cam-cam follower relationship with the receiving portion 138 than the first truncated cone portion 142. For example, the second truncated cone portion 150 is flatter than the first truncated cone portion 142 to reduce the likelihood that torsion will urge the locking pin 140 out of engagement with the receiving portion 138. The second cone portion 150 can also define a rougher surface finish than the first truncated cone portion 142 to be less likely to cooperate in cam-cam follower relationship with the receiving portion 138 than the first truncated cone portion 142. For example, the surface finish of the first truncated cone portion 142 can have a relatively smaller coefficient of friction to facilitate low withdrawal force during normal lock bolt retraction at vehicle start. The force required to withdrawal the dual surface-finish locking pin 140 at vehicle start could be the same as the force required to withdrawal the single surface-finish locking pin 40 at vehicle start. On the other hand, the surface finish of the second truncated cone portion 150 can have a relatively greater coefficient of friction reduce the likelihood of forced cam out of the locking pin 140. During forced cam out of the locking pin 140 on the first cone portion 142 with the lower friction surface, the cam force urging the locking pin 140 out of engagement with the receiving portion 138 is less than the cam force urging the locking pin 140 out of engagement with the receiving portion 138 because of the higher friction surface of the second cone portion 150.

In the different embodiments, the sliding motion of the lock pin 40 or the lock pin 140 can also be accomplished remotely via a cable, or by electromechanical mechanization.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A steering column assembly for an automotive vehicle comprising:
    a steering shaft defining at least one receiving portion; and
    a locking pin selectively insertable in said at least one receiving portion and having a first truncated cone portion narrowing from a first end at a first angle to a second end and a second truncated cone portion extending from said second end and narrowing from said second end at a second angle to a third end and said first and second angles being different.

2. The steering column assembly of claim 1 wherein said second angle is less than said first angle.

3. The steering column assembly of claim 2 wherein said second angle is one-half said first angle.

4. The steering column assembly of claim 3 wherein said second angle is four degrees.

5. The steering column assembly of claim 1 wherein both said first and second truncated cone portions define first and second maximum diameters and each of said first and second maximum diameters are insertable in said receiving portion.

6. The steering column assembly of claim 1 wherein both said first and second truncated cone portions extend concentrically with respect to one another.

7. The steering column assembly of claim 1 wherein said receiving portion extends in parallel relation to said steering shaft and in coaxial relation to at least one of said truncated cone portions.

8. The steering column assembly of claim 1 wherein said steering shaft is further defined as a steering shaft mounted for rotation and a plate member immovably associated with said steering shaft and defining said receiving portion.

9. The steering column assembly of claim 1 wherein said receiving portion is one of an aperture and a notch.

10. The steering column assembly of claim 1 wherein at least one of said truncated cone portions defines a cam follower surface.

11. The steering column assembly of claim 1 wherein said first truncated cone portion defines a first surface finish and said second truncated cone portion defines a second surface finish wherein said second surface finish having a higher coefficient of friction than said first surface finish.

12. A steering column assembly for an automotive vehicle comprising:
    a steering shaft;
    a plate member immovably associated with said steering shaft and defining a receiving portion; and
    a locking pin selectively insertable in said receiving portion, said locking pin having a first truncated cone portion narrowing from a first end at a first angle to a second end and a second truncated cone portion extending from said second end and narrowing from said second end at a second angle to a third end and said first and second angles being different and wherein said second angle is less than said first angle.

13. The steering column assembly of claim 12 wherein both said first and second truncated cone portions are intermittently insertable in said receiving portion during rotation of said plate member.

14. The steering column assembly of claim 12 wherein said receiving portion extends in parallel relation to said steering shaft and in coaxial relation to both of said truncated cone portions.

15. The steering column assembly of claim 12 wherein only one of said truncated cone portions defines a cam follower surface.

16. The steering column assembly of claim 12 wherein said receiving portion is one of an aperture and a notch.

17. A steering column assembly for an automotive vehicle comprising:
    a steering column housing defining a first longitudinal recess and a second recess extending parallel and offset with respect to said first recess;
    a steering shaft mounted for rotation within said first recess of said steering column housing;
    a plate member immovably associated with said steering shaft and defining a receiving portion intermittently communicating with said second recess during rotation of said steering shaft; and
    a locking pin slidably mounted within said second recess of said steering column housing and selectively insertable in said receiving portion when said receiving portion is in communication with said second recess, said locking pin having a first truncated cone portion narrowing from a first end at a first angle to a second end and a second truncated cone portion extending from said second end and narrowing from said second end at a second angle to a third end and said first and second angles being different.

* * * * *